(12) United States Patent
Currier et al.

(10) Patent No.: US 10,891,393 B2
(45) Date of Patent: Jan. 12, 2021

(54) SYSTEM AND METHOD FOR ENTERPRISE PRIVACY INFORMATION COMPLIANCE

(75) Inventors: Michael J. Currier, Cornelius, NC (US); Duanhua Tu, Southbury, CT (US); Sunil Joshi, Marietta, GA (US); Murthy V. Rallapalli, Alpharetta, GA (US); Lisa N. Schenkewitz, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 3130 days.

(21) Appl. No.: 12/268,053

(22) Filed: Nov. 10, 2008

(65) Prior Publication Data

US 2010/0121773 A1    May 13, 2010

(51) Int. Cl.
  *G06F 21/62* (2013.01)
  *G06F 21/57* (2013.01)
  *G06Q 30/02* (2012.01)
  *G06Q 30/00* (2012.01)

(52) U.S. Cl.
  CPC ........ *G06F 21/6245* (2013.01); *G06F 21/577* (2013.01); *G06Q 30/00* (2013.01); *G06Q 30/0282* (2013.01)

(58) Field of Classification Search
  CPC .......................... G06F 21/6245; G06F 21/577
  USPC .................... 705/325, 10, 80; 726/1
  See application file for complete search history.

(56) References Cited

U.S. PATENT DOCUMENTS

| | | | |
|---|---|---|---|
| 6,820,069 B1 | 11/2004 | Kogan et al. | |
| 7,206,758 B2* | 4/2007 | Kuehr-McLaren et al. | ................. 705/26.2 |
| 7,337,429 B1 | 2/2008 | Psaras et al. | |
| 7,451,391 B1* | 11/2008 | Coleman | ................. G06F 40/20 715/234 |
| 7,467,107 B1* | 12/2008 | Mulligan, Jr. | ......... G06Q 40/00 705/35 |
| 7,885,943 B1* | 2/2011 | Yehuda | ................. G06Q 10/10 707/694 |
| 2002/0029201 A1 | 3/2002 | Barzilai et al. | |
| 2005/0091101 A1* | 4/2005 | Epling et al. | ................... 705/10 |
| 2005/0149452 A1* | 7/2005 | Clayton et al. | ................. 705/59 |
| 2005/0160286 A1* | 7/2005 | Currie et al. | ................. 713/200 |
| 2005/0187891 A1* | 8/2005 | Johnson | ................ G06F 11/202 |
| 2005/0262063 A1* | 11/2005 | Conboy et al. | ................... 707/3 |
| 2006/0259385 A1 | 11/2006 | Menken | |

(Continued)

OTHER PUBLICATIONS

Dan Jerker B. Svantesson: Geo-location technologies and other means of placing borders on the 'borderless' Internet. (Sep. 1, 2004).*

(Continued)

*Primary Examiner* — Sangeeta Bahl
(74) *Attorney, Agent, or Firm* — Jay Wahlquist; Andrew M. Calderon; Roberts Calderon Safran & Cole, P.C.

(57) ABSTRACT

A system and method for enterprise privacy information compliance (EPIC), configured to scan and interrogate a site for privacy compliance based on one or more privacy standards. The method includes identifying at least one website associated with a URL and determining whether the at least one website is compliant with one or more privacy requirements. The method also includes generating a report indicating which of the one or more privacy requirements are met and which of the one or more privacy requirements are unmet.

27 Claims, 12 Drawing Sheets

(56) References Cited

U.S. PATENT DOCUMENTS

2007/0199064 A1* 8/2007 Pueblas .......................... 726/13
2008/0133500 A1* 6/2008 Edwards ............. G06F 17/3053
2010/0074524 A1* 3/2010 Stollman ....................... 382/175

OTHER PUBLICATIONS

CryptoHeaven: "SSL Protocol".*
Anton, Analyzing website privacy requirements using a privacy goal taxonomy, 2002 IEEE (Year: 2002).*
"Compliance monitoring of a corporate website: accessibility, privacy, quality, interactive activity", 2007, pp. 1-2, URL: http://www.erigami.com/truwex/accessibility-privacy-monitoring.html.

\* cited by examiner

Support xyz Innovation Centers for Business Partners customer satisfaction survey

Your company has recently used one of our centers to test or enable your application on xyz platforms. Your feedback on your experience with our centers ensures that we continue to provide quality service to you. If you have not used our services and would like to give feedback about our Web site or offerings, please contact PartnerWorld Contact Services.

The fields indicated with an asterisk ( * ) are required to complete this transaction; other fields are optional. If you do not want to provide us with the required information, please use the Back button on your browser to return to the previous page, or close the window or browser session that is displaying this page.

Your name: *

FIG. 3

The communication option you select below applies only to this transaction. If you are a member of PartnerWorld, this selection does not automatically update your profile. To make permanent changes, you must update your profile.

This data, at any time revocable by you, may be stored by xyz or an affiliate on an international server and used by xyz or an affiliate.

E-mail: Stay informed about xyz products, services, and other offerings! If you want to stay informed by e-mail, please let us know by checking the box below.

☐ E-mail: Yes, please have xyz or an affiliate send me e-mail.

FIG. 4

This data, at any time revocable by you, may be stored by xyz or an affiliate on an international server and used by xyz or an affiliate.

E-mail: Stay informed about xyz products, services, and other offerings! If you want to stay informed by e-mail, please let us know by checking the box below.

☐ E-mail: Yes, please have xyz or an affiliate send me e-mail.

Other communications: xyz or an affiliate or selected organizations may keep you informed about xyz related products, services and other offerings through ways other than e-mail, for example, by telephone or postal mail. If you do not want us to use the information you provided here to keep you informed through other ways, please indicate in the box below.

FIG. 5

This data, at any time revocable by you, may be stored by xyz or an affiliate on an international server and used by xyz or an affiliate.

E-mail: Stay informed about xyz products, services, and other offerings! If you want to stay informed by e-mail, please let us know by checking the box below.

☐ E-mail: Yes, please have xyz or an affiliate send me e-mail.

Other communications: xyz or an affiliate or selected organizations may keep you informed about xyz related products, services and other offerings through ways other than e-mail, for example, by telephone or postal mail. If you do not want us to use the information you provided here to keep you informed through other ways, please indicate in the box below.

☐ Other communications: Please do not use the information I have provided here.

FIG. 6

Thank you for taking the time to complete our survey!

The communication option you select below applies only to this transaction. If you are a member of PartnerWorld, this selection does not automatically update your profile. To make permanent changes, you must update your profile.

This data, at any time revocable by you, may be stored by xyz or an affiliate on an international server and used by xyz or an affiliate.

E-mail: Stay informed about xyz products, services, and other offerings! If you want to stay informed by e-mail, please let us know by checking the box below.

☐ E-mail: Yes, please have xyz or an affiliate send me e-mail.

Other communications: xyz or an affiliate or selected organizations may keep you informed about xyz related products, services and other offerings through ways other than e-mail, for example, by telephone or postal mail. If you do not want us to use the information you provided here to keep you informed through other ways, please indicate in the box below.

☐ Other communications: Please do not use the information I have provided here.

By clicking Submit, you agree that xyz may process your data in the manner indicated above and as described in our Privacy policy

 Submit

FIG. 7

Thank you for taking the time to complete our survey!

The communication option you select below applies only to this transaction. If you are a member of PartnerWorld, this selection does not automatically update your profile. To make permanent changes, you must update your profile.

This data, at any time revocable by you, may be stored by xyz or an affiliate on an international server and used by xyz or an affiliate.

E-mail: Stay informed about xyz products, services, and other offerings! If you want to stay informed by e-mail, please let us know by checking the box below.

☐ E-mail: Yes, please have xyz or an affiliate send me e-mail.

Other communications: xyz or an affiliate or selected organizations may keep you informed about xyz related products, services and other offerings through ways other than e-mail, for example, by telephone or postal mail. If you do not want us to use the information you provided here to keep you informed through other ways, please indicate in the box below.

☑ Other communications: Please do not use the information I have provided here.

By clicking Submit, you agree that xyz may process your data in the manner indicated above and as described in our Privacy policy

 Submit

FIG. 8

Thank you for taking the time to complete our survey!

The communication option you select below applies only to this transaction. If you are a member of PartnerWorld, this selection does not automatically update your profile. To make permanent changes, you must update your profile.

This data, at any time revocable by you, may be stored by xyz or an affiliate on an international server and used by xyz or an affiliate.

E-mail: Stay informed about xyz products, services, and other offerings! If you want to stay informed by e-mail, please let us know by checking the box below.

☐ E-mail: Yes, please have xyz or an affiliate send me e-mail.

Other communications: xyz or an affiliate or selected organizations may keep you informed about xyz related products, services and other offerings through ways other than e-mail, for example, by telephone or postal mail. If you do not want us to use the information you provided here to keep you informed through other ways, please indicate in the box below.

☐ Other communications: Please do not use the information I have provided here.

By clicking Submit, you agree that xyz may process your data in the manner indicated above and as described in our Privacy policy.

 Submit

FIG. 9

```
us.backout.A=are required;
complete this transaction;
other fields are optional;
provide us with;
the required information;
button on your browser us.personalInfo=at any time;
revocable by you;
may be stored;
on an international server;
by xyz or an affiliate.

us.personalInfo.B=This data, at any time revocable by you, may be stored by xyz or an affiliate on an international server an us.sendstmt.oldG=By clicking submit, you agree that xyz may process your data in the manner indicated above and as described us.sendstmt.G=By clicking submit, you agree that xyz may process your data in the manner indicated above and as described in us.notice.C=E-mail: Stay informed about IBM products, services, and other offerings! If you want to stay informed by e-mail, us.notice=about xyz products;
services, and other offerings!;
If you want to;
stay informed;
by e-mail;
please let us know;
by checking the box below.

us.optin.D=e-mail: Yes, please have xyz or an affiliate send me e-mail.

us.optin.alt=May we send you updates using e-mail {or fax}?
[ ] Yes, please use e-mail {or fax} to send me information about other offerings.

us.restrictuse.F=Other communications: Please do not use the information I have provided here.

us.optout.alt=If you prefer, we will not contact you using the data you provided in this instance.;
[ ] Please do not use the contact details provided here to send me information about other offerings.

us.opt.radio=input;
type=;
name=;
value=;

us.restrict.statement=xyz or an affiliate or selected organizations;
may keep you informed about xyz related products, ;
services and other offerings;
through ways other than e-mail, ;
```

FIG. 11

EPIC home

Data privacy tool

Help xyz EPIC data privacy compliance tool

The EPIC privacy compliance tool validates compliance with data privacy standards.

- 300 → Scope: ☐ check for additional requirements (transborder data flows)
- 305 → Country: [United States ▼]
- 310 → Language: [English ▼]
- 315 → Search level: [one level ▼]
- 320 → Exclude these sites from search: [                    ]
- 325 → Application saves Personal data:
  - ⦿ Yes (Data saved for marketing purposes)
  - ◯ No (Data is not saved, and is one time use only)
- 330 → Enter the URL: [06soaas.nsf/enrollnew?openform&location=Seattle&S_TACT=]
- 335 → User name: [                    ]
- 340 → Password: [        ]

[Clear] [Submit]

URL checked: http://www-304.xyz.com/jct09002d/events/soaas/06soaas.nsf/enrollnew?openform&location=Seattle&S_TACT=

350
| | |
|---|---|
| SSL security | pass |
| Data and backout statement (A) | pass |
| Notice statement (C) | pass |
| Opt in (D) | pass |
| Opt out (E) | pass |
| Send statment (F) | pass |
| Privacy link (G) | pass |
| Owner of the website is valid. | pass |
| Other: form method=post | pass |

If you have any question about the standards for privacy, please see:
http://w3.xyz.com/standards/internet/privacy/example.shtml Terms of use

FIG. 12

SYSTEM AND METHOD FOR ENTERPRISE PRIVACY INFORMATION COMPLIANCE

FIELD OF THE INVENTION

The invention generally relates to a system and method for enterprise privacy information compliance (EPIC) and, in particular, to scanning and interrogating a site for privacy compliance based on one or more privacy standards.

BACKGROUND

In today's world of the Internet, intranets, and softcopy computer data, it becomes critical to maintain a watchful eye on data privacy. Part of keeping a watchful eye on private data is being able to identify when private data is being submitted over the Internet and provide users with information as to how the private data will remain private. Keeping a watchful eye on private data also requires informing users as to how the private data is going to be used once submitted over the Internet.

Private data may include information in which a person has an expectation of privacy. The term "privacy" is often confused or even interchanged with the term "security." Privacy relates to the practice of collecting, handling, using, and protecting a specific category of data, namely personal information. Security, although related to privacy, calls for the protection of data but does not ensure data privacy.

The general principles of privacy include fairness, purpose, accuracy, disclosure, security, and access. Fairness relates to collecting and processing personal information fairly and lawfully. Purpose relates to collecting personal information which is necessary for a particular purpose. Purpose may also relate to processing personal information for the purpose it was collected. Accuracy is directed to keeping personal information as accurate, complete, and up-to-date as is necessary for the purpose for which it is processed. Disclosure includes making personal information available in appropriate circumstances. Security relates to implementing appropriate technical and organizational measures to safeguard personal information. Access may include providing individuals with appropriate access to personal information about themselves.

Privacy can be categorized using one or more privacy elements, which include notification, choice, enforcement, access, and integrity. Notification includes providing notice whenever personal data is being collected. Notification may include providing the user with exactly what data is being gathered and for what specific purpose. Choice includes requesting consent for the use of the data, or for use by any other third parties, and providing the data owner with the ability to opt out of marketing or solicitation contact. Enforcement includes being accountable for compliance. Access includes allowing an individual to see and correct personal data or change their opt-in or opt-out status. Integrity includes taking appropriate steps to protect the data's confidentiality and its accuracy. Integrity also includes keeping only personal data that has been identified as necessary, for as long as necessary, and for the intended purpose.

SUMMARY

In a first aspect of the invention, a computer implemented method for determining privacy compliance comprises identifying at least one website associated with a URL and determining whether the at least one website is compliant with one or more privacy requirements. The method also comprises generating a report indicating which of the one or more privacy requirements are met and which of the one or more privacy requirements are unmet.

In another aspect of the invention, a computer program product comprising a computer usable medium having readable program code embodied in the medium is provided. The computer program product includes at least one component operable to: scan one or more websites; apply one or more rules to the one or more websites; identify whether the one or more websites comply with the one or more rules; and generate a report for the one or more websites, wherein the report includes the applied one or more rules and whether the one or more websites comply with the one or more rules.

In yet another aspect of the invention, a method for determining privacy compliance, comprises providing a computer infrastructure being operable to: receive at least one URL; identify the owner of the at least one URL; check transborder conditions applicable to the at least one URL; filter out one or more of the at least one URL; inspect a website associated with the at least one URL for privacy compliance based on one or more privacy requirements; and generate a report indicating whether the website associated with the at least one URL is compliant with one or more privacy requirements.

In another aspect of the invention, a system comprises an enterprise privacy information compliance (EPIC) tool configured to scan a website for privacy compliance based on one or more privacy standards, the EPIC tool implemented on an Internet or an intranet and requiring only server side code.

BRIEF DESCRIPTION OF THE DRAWINGS

The present invention is described in the detailed description which follows, in reference to the noted plurality of drawings by way of non-limiting examples of exemplary embodiments of the present invention.

FIGS. 3-10 shows exemplary privacy compliance statements in accordance with aspects of the invention;

FIG. 11 shows a portion of an exemplary rule set file in accordance with aspects of the invention; and FIG. 12 shows an exemplary embodiment in accordance with aspects of the invention.

DETAILED DESCRIPTION

Figure 1:
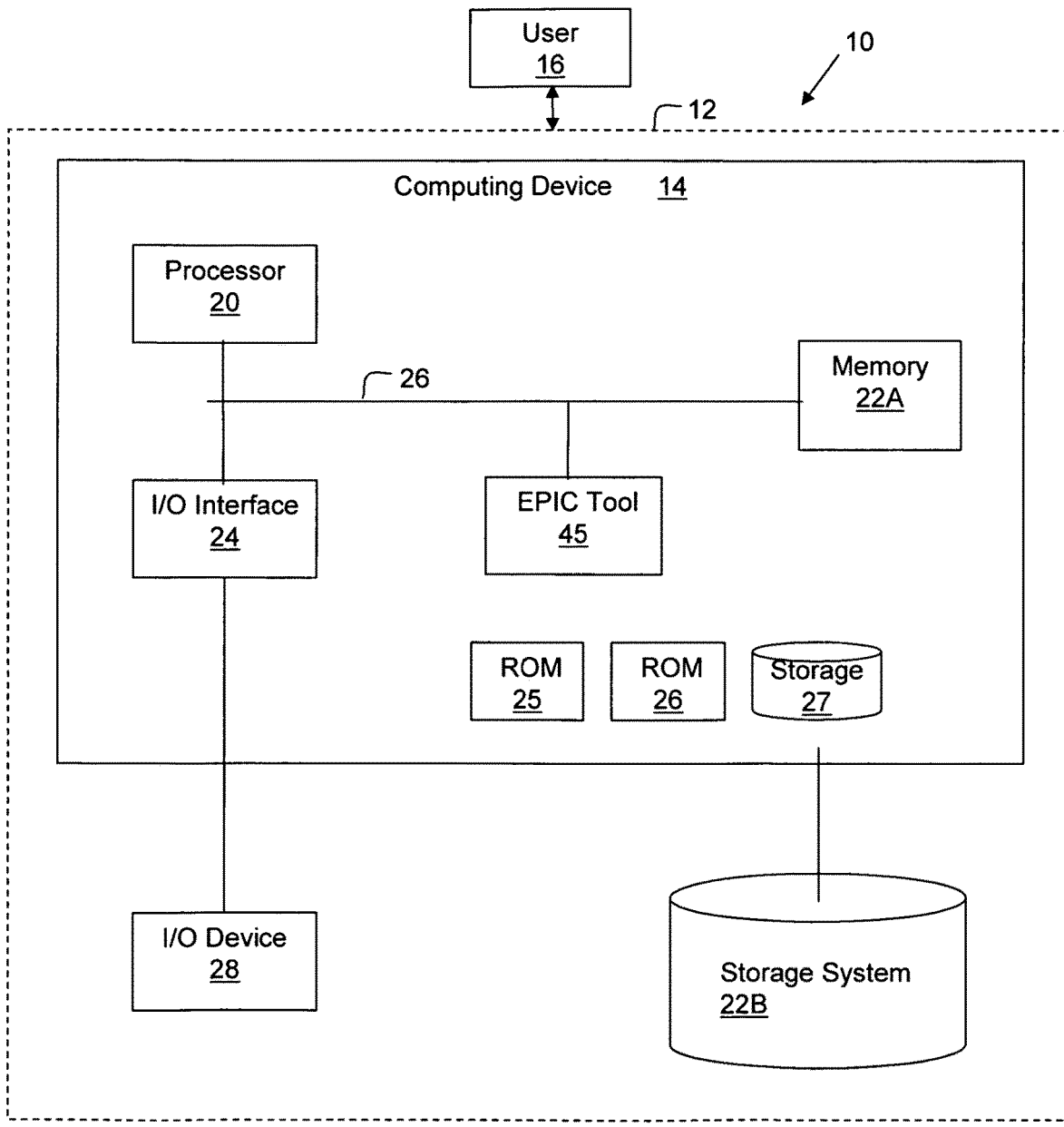
FIG. 1 shows an illustrative environment for implementing the steps in accordance with the invention.

The invention is directed to a system and method for enterprise privacy information compliance (EPIC) and, in particular, to scanning and interrogating a site for privacy compliance based on one or more privacy standards. More specifically, the invention includes a tool ("EPIC tool") to automatically scan websites for privacy compliance and limit the amount of visual inspection that is required to determine whether a website is compliant. Beneficially, the EPIC tool decreases the amount of time that is needed to check privacy compliance and also increases the accuracy of the compliance checks.

Data privacy compliance standards are used to determine whether websites and/or webpages associated with the website are adhering to the guidelines for collecting and storing a user's personal information. These guidelines may include a number of privacy checks that are issued each day by companies and/or are introduced as legislation by various state governments, the federal government, and/or international governments such as the European Union. These guidelines may be set forth to protect any number of data privacy elements that may be stored by a website. Exemplary private information that may be collected includes a person's name, address, phone number, email, etc. Frequently this information is stored by the website for future use.

Websites and/or applications are expected to be compliant with issued privacy guidelines and can be prosecuted for violating privacy laws if one or more of the privacy guidelines fail. Websites, applications, webpages, etc., are considered to be non-compliant when the appropriate privacy statements are not provided to the user. Websites, applications, webpages, etc., may also be considered non-compliant when they do not adhere to mandatory security and/or data collection requirements. Non-compliancy may be reprimanded internally by the company or by external entities. Accordingly, it is important to make sure that websites, applications, webpages, etc., are compliant. To date, this has been performed via visual inspection of the website, application, webpage, etc.

The present invention includes an EPIC tool, which is a web based tool that automatically verifies compliance with an entity's privacy practices by ensuring that required text, POST form method, encryption, privacy links, etc., are in place on the webpage. The EPIC tool is a web based tool that uses server side code, e.g., it requires no client side code. Moreover, as the EPIC tool is automated, visual inspection of each website, application, webpage, etc., for privacy compliance is no longer required.

The EPIC tool is configured to scan and interrogate one or more websites for privacy compliance based on internal company standards and/or governmental standards. The EPIC tool is also configured to provide a generic and/or a comprehensive report to identify areas of non-compliance. In embodiments, the report may include, e.g., compliance issues that were identified, whether the compliance issue was met, the exact HTML where the compliance issue was presented and/or where the non-compliance occurred, etc. The EPIC tool may also grade the website on its compliance via a metric. In embodiments, this metric may be algorithmic based and may grade the website on the existence of mandatory and/or recommended guidelines on the website.

Accordingly, the present invention beneficially allows a website, application, webpage, etc., to be scanned for privacy compliance thereby limiting the amount of visual inspection required to determine compliancy and increasing the accuracy of the compliancy checks.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

a portable computer diskette,
a hard disk,
a random access memory (RAM),
a read-only memory (ROM),
an erasable programmable read-only memory (EPROM or Flash memory),
a portable compact disc read-only memory (CDROM),
an optical storage device, and/or The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises an EPIC Tool 45. By utilizing the EPIC Tool 45, a website can be scanned and interrogated for privacy compliance based on one or more privacy standards in accordance with the invention.

In embodiments, the scanning and/or interrogation can be performed using a parser, or other mechanism capable of syntactic analysis. Embodiments may also use any number of techniques to analyze the code used to create a website, application, webpage, etc., to determine data encoding schemes. Moreover, any number of artificial intelligence algorithms relating to natural language processing, searching, fuzzy logic, neural networks, etc., may be used to determine whether a website, application, webpage, etc., includes appropriate statements, encoding, security, etc., to comply with privacy requirements. Upon scanning and/or interrogating a website, application, webpage, etc., the EPIC Tool 45 may create a report for a user 16, which articulates areas of privacy compliance and/or noncompliance.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution.

The computing device 14 is in further communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, microphones, headsets, etc. The storage system 22B can include an "inventory" of sounds, modifications, etc., which may be selected by the user's avatar.

In general, the processor 20 executes computer program code, which is stored in the memory 22A, a read-only memory (ROM) 25, random access memory (RAM) 26, storage 27, and/or storage system 22B. The computer code may be representable of the functionality of the EPIC Tool 45. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the processes described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Exemplary Implementation of the System

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
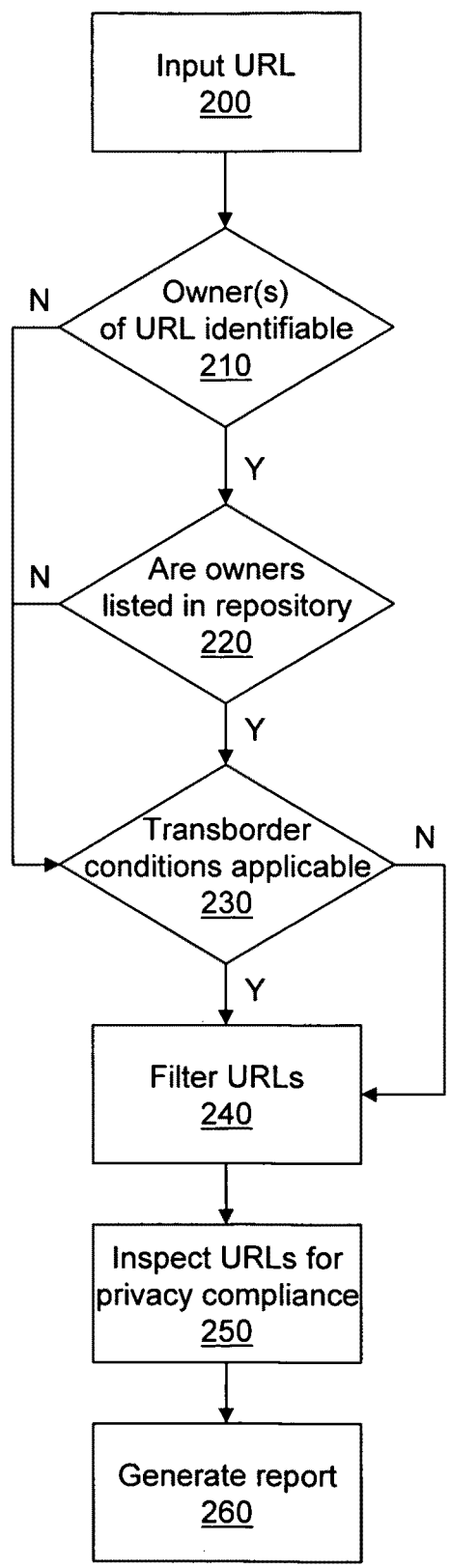
FIG. 2 shows a flow chart of an exemplary process in accordance with aspects of the invention.

FIG. 2 shows an exemplary process according to embodiments of the invention. In particular, at step 200, one or more uniform resource locators (URL) are inputted into the EPIC Tool. The user may also input additional information such as, for example, the country, language, search level, one or more sites to be excluded from the search, a user name, a password, etc. This input may be performed manually or automatically by a computing device detecting websites, applications, webpages, etc., within a network.

Upon receiving a URL, the EPIC Tool is configured to identify the owners of the URL, at step 210. If no owners are identifiable, the EPIC Tool continues to step 230. If one or more owners are identifiable, the EPIC Tool determines whether any of the identified owners are listed in an existing repository of Internet addresses, at step 220. This allows the EPIC Tool to gain information on the listed owners and, in embodiments, provide the identified owners with information on their level of compliance. Upon gaining this information, or alternatively, upon failing to find any of the identified owners in the repository, the EPIC Tool continues on to step 230.

At step 230, the EPIC Tool checks the origin of the website to determine whether one or more transborder conditions apply. Transborder conditions may apply when private information is obtained from a user in a state or country that is different from the state or country that is hosting the website, the state of country of the owner(s) are located, etc. The existence of transborder conditions indicates that international privacy compliance issues may exist. This may influence what statements and/or notifications need to be given to the user in order for the website to be privacy compliant.

At step 240, the inputted URLs may be filtered. The type of filter applied to the URLs may vary between embodiments and may be used to, e.g., filter out websites where private information is not processed and/or collected. The filter may also be used to filter out websites that have already passed the most recent privacy compliance requirements. Additionally, in embodiments, the filter may be used to filter out websites that may have private information but do not need to meet privacy compliance requirements for one reason or another.

Upon filtering out URLs, the remaining URLs may be inspected for privacy compliance, at step 250. The process of inspecting may be by a country, search level, etc., as described with reference to FIG. 12. The process of inspecting for privacy compliance may include ensuring required text, POST form method, encryption, and/or privacy links are in place on a website, application, webpage, etc. In embodiments, this may be performed by inspecting HTML to determine the type of encoding that is used, e.g., GET or POST form method. Privacy compliance may also be inspected by analyzing the configuration details of a server, by restricting encryption ciphers that a server can use, etc. Embodiments may also inspect for privacy compliance by parsing text in the website, application, webpage, etc., for key words or features and comparing the parsed text against a database of privacy compliance verbiage and/or disclaimers. For example, the EPIC Tool may be used to insure that standard verbiage and disclaimers are provided to users when collecting private data from the users. In embodiments, exact verbiage may be required or, alternatively, only key phrases or words may be required for compliance, in which case a parser can be used to determine compliance. At step 260, a report of the results of the privacy compliance inspection may be generated and presented to one or more entities.

Exemplary Compliance Requirements

The EPIC Tool may be used to verify that websites, applications, webpages, etc., include privacy compliance requirements. For example, one or more specific privacy compliance statements may be required on one or more websites that require personal information. Exemplary statements are illustrated in FIGS. 3-10 in accordance with embodiments of the invention. It should be understood that the exemplary statements in FIGS. 3-10 are not to be limiting. Moreover, it should be understood that the statements in FIGS. 3-10 may be altered to reflect consistently changing governmental and/or entity privacy compliance policies.

FIG. 3 illustrates a data and backout statement, which allows a user to back out of having to provide private information. The EPIC Tool can be used to determine whether the backout statement is in compliance with privacy requirements using any number of mechanisms known to those of skill in the art such as, e.g., parsing. In embodiments, the backout statement may inform the user as to what information is required, what information is optional, and why the information is needed. Additionally, the backout statement may allow the user to halt and/or refuse entry of information. In embodiments, a user may halt and/or refuse entry of his or her private information by exiting the webpage, selecting a "back" button on a browser to return to a previous page, etc. By providing users with a backout statement, users are notified that private information will be collected and users are provided with the choice on whether or not to allow the information to be collected.

FIG. 4 illustrates a privacy statement that may be required in one or more countries. The statement may identify the data being collected as personal data and inform the user of his or her right to access and/or revoke their information. Additionally, this statement may indicate that the user's information may be stored on an international server and/or used by the entity collecting the data or an affiliate thereof. In embodiments, this statement may be displayed before any personal information collection fields.

The EPIC Tool can be used to determine whether the privacy statement in FIG. 4 is compliant with government, company, etc., privacy requirements. In embodiments, the determination may be performed by parsing text in a website, application, and/or webpage and comparing the parsed text with required privacy statement verbiage that may be stored in a database, such as storage system 22B. By determining whether the statement is compliant, the EPIC Tool assures that general privacy principles are met, that users are informed that private information is being collected, and that users are informed of their right to access their private information.

FIG. 5 illustrates a statement that notifies the user about communication mechanisms such as email. For example, the statement may allow the user to select a feature that allows the user to receive communications about products, services, offerings, etc., from an entity via one or more communication mechanisms. The EPIC Tool may determine whether verbiage in the statement complies with privacy requirements set forth from one or more entities, such as governments, businesses, etc. In embodiments, this determination may be performed via a parser or similar mechanism that allows text on a website, application, and/or webpage to be identified and compared to required verbiage, which may be stored in a database.

FIG. 6 illustrates an exemplary selection feature from FIG. 5. In particular, FIG. 6 illustrates an opt-in statement, which the user may select to receive future communications from an entity, an entities affiliate, etc. While an opt-in statement is used for illustrative purposes, it should be understood that the selection feature may be embodied as an opt-out statement. By providing users with the statement in FIG. 5, and the ability to opt-in or opt-out of the receiving future communications, users are given the ability to consent to how their private information is used and also given the ability to avoid unwanted marketing and/or solicitation contact. Thus, the statements in FIGS. 5 and 6 satisfy important privacy elements.

FIG. 7 illustrates a restricted use statement according to embodiments of the invention. The restricted use statement may be used to inform the individual of his or her right to restrict other forms of communication. For example, the restricted use statement may inform the user of his or her right to restrict communication via phone, postal mail, etc.

The verbiage used in the restricted use statement can be assessed using the EPIC Tool. For example, the EPIC tool may be used to determine whether key phrases and/or terms are present in the restricted use statement. This ensures that users are presented with adequate information about how their information is to be used. By presenting users with adequate information, users can restrict the use of their information to the intended purposes or allow the information to be used for additional purposes.

FIG. 8 illustrates an exemplary selection feature of FIG. 7. More specifically, FIG. 8 includes an opt-out selection feature that allows a user to refrain from having his or her information used for purposes of receiving communications from an entity via one or more of the presented communication methods. By selecting the opt-out feature, the user will not be informed of products, services, offerings, etc., via the listed communication mechanisms. While an opt-out statement is used for illustrative purposes, it should be understood that the selection feature may be embodied as an opt-in statement. By providing users with an opt-out or opt-in selection, the EPIC Tool can ensure that users are given the proper ability to consent to how their information is used by the collecting entity.

FIG. 9 illustrates a send statement according to embodiments of the invention. The send statement notifies the user that by submitting the form, website, application, webpage, etc., the entity may use the user's information in a manner consistent with the terms of the entity's privacy policy. In embodiments, the send statement may provide a link to the entity's privacy policy and/or outline features of the privacy policy. Embodiments may provide a selection mechanism for submitting the form, website, application, webpage, etc., next to the send statement. Notably, while the send statement may be required in certain countries, it should be understood that the send statement, as well as any of the other statements discussed herein, may not be required in certain countries and are, therefore, not required for privacy compliance purposes.

The EPIC Tool may determine the existence of the send statement, and the substance thereof, using any method known to those of skill in the art. For example, the EPIC Tool may determine whether the send statement is required by the country hosting the website, application, webpage, etc. The EPIC Tool may also use a parser to determine whether the privacy policy is provided to the user next to the send statement. By checking for these features, the EPIC Tool complies with privacy requirements and ensures that users are informed of how their private information is going to be used prior to sending the private information to the entity.

Figure 10:
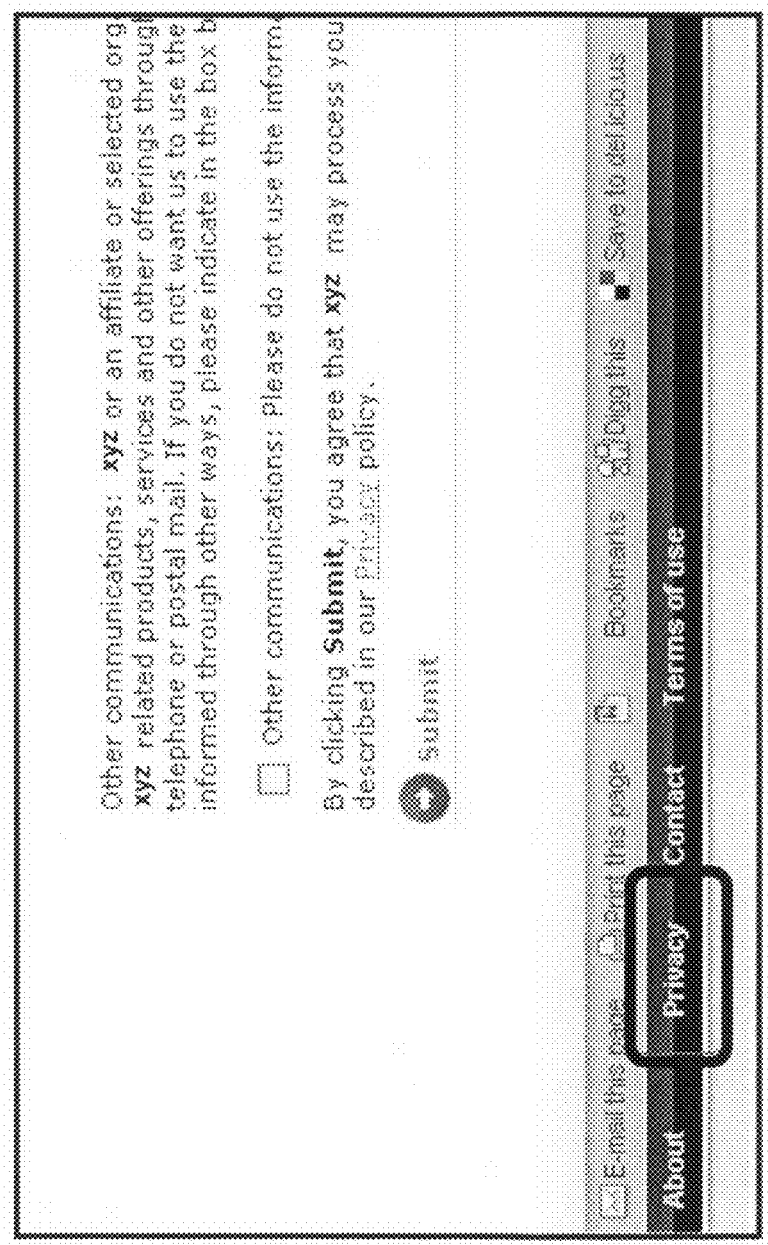

FIG. 10 illustrates a selection mechanism for linking to the entity's privacy policy. This privacy policy selection mechanism should be included on pages that collect private data. The location of the privacy policy may vary between embodiments. For example, embodiments may position the privacy policy in a footer, in a side frame, as a header, as part of an internal text box, etc., so long as the link to the privacy policy is made available on the where the private information is being collected.

The EPIC Tool may parse the verbiage on a website, application, webpage, etc., to determine whether a privacy policy is listed. Moreover, in embodiments, the EPIC Tool may search the code used to create the website, application, webpage, etc., to identify the existence of one or more links, as well as the location of the linked documents, forms, websites, webpages, etc. By determining whether a privacy policy is listed, the EPIC Tool ascertains whether an entity complies with privacy requirements in listing the privacy policy and also provides users with important information as to what private information is being collected and how the private information is to be used.

While the exemplary privacy compliance statements in FIGS. 3-10 have been illustrated in English for the sake of readability, it should be understood that the privacy compliance statements may be presented and scanned using any number of languages. For example, the backout statement in FIG. 4 may be presented to the user in one or more languages such as English, Spanish, French, German, Japanese, Chinese, etc. In embodiments, the native language of the statement may be given beside the translated version of the statement. Embodiments may also allow a user to actively choose what language in which to view the statement.

Exemplary Embodiments

FIG. 11 illustrates a portion of an exemplary rule set file according to embodiments of the invention. The rule set file is configured to include one or more rules as to what should and/or must be included on a website to comply with privacy requirements. For example, the rule set may specify that each of the statements articulated in FIGS. 3-10 must be included on a website or, if not, the website is non-compliant. The rule set may also be used to indicate which statements must be included on the website based on whether the privacy statement is a governmental requirement, an entity's requirement, etc. Thus, e.g., a statement may be required for a website being hosted in a country that requires the statement but not in a country that does not require the statement. Likewise, a statement that is required by a government may be mandatory whereas an entity's internal statement may be advisable but not mandatory.

The rule set may also include variations of the required statements and/or define which portion(s) of the statements must appear verbatim. In embodiments, the process of determining the closeness of a statement may be ascertained using any number of algorithms known to those of skill in the art, such as, e.g., artificial intelligence algorithms. For example, a rule may indicate that a specific phrase or series of words must be presented on a website for compliance purposes. A parser can be used to analyze the statement to determine if the series of words is present. If the words do not appear verbatim, an artificial intelligence algorithm such as a fuzzy logic algorithm can be used to determine the likelihood that the statement includes the series of words.

In embodiments, rules in the rule set may be modified, added, deleted, etc., to reflect changes and/or updates in privacy compliance standards. Once the rules in the rule set have been applied to a website, application, webpage, etc., a report may be generated indicating what rules were met and what rules were not met. Based on this report, it can be determined whether a website, application, webpage, etc., is compliant with the applicable privacy requirements.

FIG. 12 illustrates an exemplary interface implementing an embodiment of the invention. In particular, FIG. 12 allows a user, administrator, or the like, to identify the scope 300 of the privacy compliance check. The scope may indicate whether additional requirements, such as transborder data flows, should be considered when performing the privacy compliance check.

The interface includes a plurality of fillable fields 300-340. The fields may be populated by an administrator and can be applied to any number of specified websites, applications, webpages, etc., for privacy compliance. Specifically, the administrator may identify the country or countries 305 which are hosting the website, application, webpage, etc., or where the website, application, webpage, etc., appear. In addition to identifying the country 305, the administrator may identify which language 310 to use when checking the website, application, webpage, etc., for compliance. In embodiments, the language 310 may also indicate what language should be used to present the statements to the user.

The administrator may also indicate a desired search level 315. The search level 315 may relate to how many levels will be scanned by the EPIC Tool. For example, if a single search level is selected, the EPIC Tool may scan only the page indicated by the URL. However, if a second search level is selected, the EPIC Tool may scan the page indicated by the URL as well as the URLs that are available from the originally indicated URL. Understandably, this process can be performed iteratively to continually check what pages are associated with a third search level, a fourth search level, etc.

In embodiments, the administrator may choose to include a number of websites and/or exclude a number of websites 320 from the compliancy check. This may be performed to keep the EPIC Tool from scanning websites that are not public to outside users, do not request private information, etc. In embodiments, a determination of whether the website includes private information may be performed automatically, e.g., by a web crawler searching for key words and/or phrases that are indicative of private information being requested. Alternatively, the determination of whether a website includes private information may be performed manually by an administrator or the like.

The administrator may indicate whether private information on a website is saved or used for a single time and then discarded without being saved 325. Exemplary purposes for storing private information may include marketing purposes, advertising purposes, etc.

The administrator may input a URL 330 to be scanned for privacy compliance or, in embodiments, the URL may be automatically obtained by the EPIC Tool. Once the URL is inputted, it can be checked for privacy compliance. In embodiments, the EPIC Tool may require a username 335 and password 340 prior to performing the privacy compliance check.

Upon inputting the URL 330, the administrator may submit the URL, along with any other entered information, or clear the inputted data. A submitted URL is checked using a rule set, such as the rule set described in FIG. 11. Once checked, the EPIC Tool is configured to generate a report 350 based on whether the privacy compliance rules are satisfied. In embodiments, the report 350 may include the rule and or statement that is required, whether the rule was satisfied, and/or a link to the requirement in those instances where a rule was not satisfied. For example, the report may indicate that the URL included the required secure socket layer (SSL), a backout statement, a notice statement, opt-in and/or opt-out options, a send statement, a link to a privacy policy, a valid website owner, and/or an appropriate POST method form, etc. In embodiments, a separate report may be created for each URL that is scanned. Additionally, embodiments may provide a general report of the privacy compliance of a plurality of websites.

Beneficially, the EPIC Tool does not require downloads. Additionally, no client side code is required, which saves on licensing fees. (Although it is contemplated that the EPIC tool can be licensed for a fee or on a subscription basis.) Moreover, the EPIC Tool can generate reports in real time and email the reports to an administrator, the owner, etc. This provides immediate feedback on whether the website passes all of the required privacy compliance standards, includes adequate encryption requirements, uses POST method, etc. Additionally, the EPIC Tool beneficially keeps up to date with changing privacy guidelines, thereby limiting the chance that a privacy compliance requirement will fail.

While the invention has been described in terms of embodiments, those skilled in the art will recognize that the invention can be practiced with modifications and in the spirit and scope of the appended claims. Additionally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A computer implemented method for determining privacy compliance comprising:
   automatically scanning, using an enterprise privacy compliance (EPIC) tool, one or more websites that have one or more privacy requirements with a web based tool using only server side code to automatically verify compliance with the one or more privacy requirements by ensuring that required privacy practices are in place on the one or more websites, wherein the one or more privacy requirements include a backout statement;
   the method further comprising:
   identifying, by the scanning and using the EPIC tool, at least one website associated with a uniform resource locator (URL);
   determining, by a processor and using the EPIC tool, whether the at least one website is compliant with the one or more privacy requirements, wherein the determining includes analyzing configuration details of a server by restricting encryption ciphers that the server is capable of using;
   generating, by the EPIC tool, a report indicating which of the one or more privacy requirements are met and which of the one or more privacy requirements are unmet based on the determining; and
   outputting, by the EPIC tool, the report, wherein the report provides immediate feedback on whether the at least one website is compliant, and guidance on modifying the at least one website to meet the one or more privacy requirements to reduce a probability that the at least one website will fail compliance.

2. The computer implemented method of claim 1, further comprising:
   designating one or more applicable countries, wherein the one or more privacy requirements depend upon the one or more applicable countries; and
   selecting one or more languages in which to present the one or more privacy requirements.

3. The method of claim 2, further comprising grading the at least one website via a metric, wherein the grade indicates a level of compliance of the at least one website associated with the URL.

4. The computer implemented method of claim 1, wherein the one or more privacy requirements include at least one of a notice statement, a send statement, and a link to a privacy policy.

5. The computer implemented method of claim 1, wherein the report includes a link to the one or more privacy requirements that are unmet.

6. The computer implemented method of claim 1, wherein the steps of claim 1 are implemented on hardware or a combination of software and hardware.

7. The method of claim 1, wherein the steps of claim 1 are offered by a service provider based on one of a fee and subscription basis.

8. The method of claim 1, wherein the determining comprises parsing text in the at least one website for key words or features, and comparing the parsed text against a database of privacy compliance verbiage and/or disclaimers.

9. A computer program product comprising a non-transitory computer usable storage medium having readable program code embodied in the storage medium, the computer program product includes at least one component of an enterprise privacy compliance (EPIC) tool operable to:
   automatically scan one or more websites that have one or more privacy requirements with a web based tool using only server side code to automatically verify compliance with the one or more privacy requirements by ensuring that required privacy practices are in place on the one or more websites, wherein the one or more privacy requirements include a backout statement; the at least one component being further operable to: apply one or more rules to the one or more websites;
   identify whether the one or more websites comply with the one or more rules, wherein the identifying includes analyzing configuration details of a server by restricting encryption ciphers that the server is capable of using;
   generate a report, based on the identifying, for the one or more websites, which includes a comparison of the applied one or more rules and compliance or noncompliance with the applied one or more rules, wherein said report includes the one or more rules, an indication that the one or more rules are met and unmet, and a link to a requirement when the one or more rules is unmet; and
   output the report, wherein the report provides immediate feedback on whether the at least one website is compliant, and guidance on modifying the at least one website to meet the one or more privacy requirements to reduce a probability that the at least one website will fail compliance.

10. The computer program product of claim 9, wherein the one or more rules include a security level check and a POST form method check.

11. The computer program product of claim 9, wherein the one or more rules include at least one of a notice statement, and a send statement.

12. The computer implemented product of claim 9, further comprising a component operable to filter the one or more websites that have already been scanned or do not include private information.

13. The computer program product of claim 9, wherein the one or more rules are configured to be at least one of updated, deleted, and added.

14. The computer program product of claim 9, wherein the report is generated in real time.

15. The computer program product of claim 9, wherein the applying the one or more rules is performed using only the server side code.

16. The computer program product of claim 9, wherein the computer program product is at least one of supported, deployed, maintained, and created by a service provider.

17. The computer program product of claim 9, wherein the steps are offered by a service provider based on one of a fee and subscription basis.

18. The computer program product of claim 9, wherein:
the one or more rules at least one of include variations of required privacy statements and define which portion of the privacy statements must appear verbatim;
the applying comprises using a parser to analyze a statement on the one or more websites to determine whether a series of words is present; and
when the series of words do not appear verbatim, using an artificial intelligence algorithm to determine a likelihood that the statement on the one or more websites includes the series of words.

19. A method for deploying an application for determining privacy compliance, comprising:
providing a computer infrastructure comprising an enterprise privacy compliance (EPIC) tool, the EPIC tool being operable to:
automatically scan one or more websites that have one or more privacy requirements with a web based tool using only server side code to automatically verify compliance with the one or more privacy requirements by ensuring that required privacy practices are in place on the one or more website, wherein the one or more privacy requirements include a backout statement;
the computer infrastructure being further operable:
receive at least one uniform resource locator (URL);
identify an owner of the at least one URL;
check transborder conditions applicable to the at least one URL;
filter out one or more of the at least one URL;
inspect a website associated with the at least one URL for privacy compliance based on one or more privacy requirements, wherein the inspecting includes analyzing configuration details of a server by restricting encryption ciphers that the server is capable of using;
generate a report indicating whether the website associated with the at least one URL is compliant with one or more privacy requirements based on the inspecting; and
output the report, wherein the report provides immediate feedback on whether the at least one website is compliant, and guidance on modifying the at least one website to meet the one or more privacy requirements to reduce a probability that the at least one website will fail compliance.

20. The method of claim 19, wherein the one or more privacy requirements comprise one or more of a secure socket layer security check, a POST form method check, an owner validation, a link to a privacy policy, a notice statement, and a send statement.

21. The method of claim 20, wherein one or more of the backout statement, the notice statement, and the send statement are presented to a user in a plurality of languages.

22. The method of claim 19, wherein the computer infrastructure is further operable to grade the at least one website via a metric, wherein the grade indicates a level of compliance of the website.

23. The method of claim 19, wherein the one or more privacy requirements are configured to be at least one of updated, deleted, and added.

24. The method of claim 19, wherein the filter is configured to filter the one or more URLs that have already been scanned or do not include private information.

25. The method of claim 19, wherein the computer infrastructure is at least one of supported, deployed, maintained, and created by a service provider.

26. The method of claim 19, wherein the steps of claim 19 are offered by a service provider based on one of a fee and subscription basis.

27. A system comprising:
a computing device comprising an enterprise privacy information compliance (EPIC) tool configured to:
scan a website for privacy compliance based on one or more privacy standards, the EPIC tool implemented on an Internet or an intranet and requiring only server side code, wherein the one or more privacy requirements include a backout statement; and
generate a report for the website, which includes an indication of which of the one or more rules are met and unmet,
output the report, wherein the report provides immediate feedback on whether the at least one website is compliant, and guidance on modifying the at least one website to meet the one or more privacy requirements to reduce a probability that the at least one website will fail compliance, wherein the scanning the website for privacy compliance comprises:
a security socket layer security check; and
determining compliance of a privacy statement on the website with the one or more privacy standards, wherein the determining includes analyzing configuration details of a server by restricting encryption ciphers that the server is capable of using.

* * * * *